United States Patent [19]
Keeler et al.

[11] Patent Number: 5,121,632
[45] Date of Patent: Jun. 16, 1992

[54] POINT LEVEL SWITCH

[75] Inventors: Manley S. Keeler, Naperville; Steven E. Margison, Downers Grove; Boyce M. Carsella, Jr., Ingleside, all of Ill.

[73] Assignee: Magnetrol International, Incorporated, Downers Grove, Ill.

[21] Appl. No.: 637,318

[22] Filed: Jan. 3, 1991

[51] Int. Cl.5 .............................................. G01F 23/26
[52] U.S. Cl. .................. 73/304 C; 324/663; 364/575
[58] Field of Search ............. 73/304 C; 324/660, 663, 324/664, 671, 674; 340/618, 620; 364/575, 581, 557, 510

[56] References Cited

U.S. PATENT DOCUMENTS

| | | | |
|---|---|---|---|
| 3,167,959 | 2/1965 | Johnson | 73/304 C |
| 3,797,311 | 3/1974 | Blanchard et al. | 73/304 C |
| 3,949,608 | 4/1976 | Abbey et al. | 364/575 X |
| 4,054,786 | 10/1977 | Vincent | 364/575 |
| 4,130,796 | 12/1978 | Shum . | |
| 4,337,638 | 7/1982 | Leonard et al. . | |
| 4,347,740 | 9/1982 | Townsend . | |
| 4,449,405 | 5/1984 | Franz et al. . | |
| 4,515,015 | 5/1985 | Kuhlman . | |
| 4,555,941 | 12/1985 | Fathauer et al. . | |
| 4,602,344 | 7/1986 | Ferretti et al. | 364/575 X |
| 4,608,657 | 8/1986 | Manome et al. . | |
| 4,624,139 | 11/1986 | Collins | 73/304 C |
| 4,658,254 | 4/1987 | Walton | 73/304 CX |
| 4,706,203 | 12/1987 | Ramsdale et al. . | |
| 4,714,929 | 12/1987 | Davidson | 364/575 X |
| 4,716,536 | 12/1987 | Blanchard | 73/304 CX |
| 4,788,488 | 11/1988 | Kramer et al. . | |
| 4,799,174 | 1/1989 | Kramer et al. | 73/304 CX |
| 4,809,129 | 2/1989 | Hansen et al. . | |
| 4,825,379 | 4/1989 | Luthra et al. | 364/575 X |
| 4,849,754 | 7/1989 | Maltby et al. | 73/304 CX |
| 4,950,998 | 8/1990 | Kramer et al. . | |

FOREIGN PATENT DOCUMENTS

44434 1/1982 European Pat. Off. .......... 73/304 C

*Primary Examiner*—William A. Cuchlinski, Jr.
*Assistant Examiner*—G. Bradley Bennett
*Attorney, Agent, or Firm*—Wood, Phillips, VanSanten, Hoffman & Ertel

[57] ABSTRACT

A point level sensor senses capacitance of a material in a vessel to determine level. The capacitance is input to a comparator which is part of an oscillator circuit developing a square wave signal having a period corresponding to capacitance. A microprocessor includes an internal counter which determines the period of four pulses to determine an average period. The microprocessor drives relay circuits providing discrete outputs according to specific precalibrated levels to be sensed. The point sensor includes a self-test mode which operates once per second to test for shorting of the probe, expected frequency response and an open probe.

20 Claims, 12 Drawing Sheets

POINT LEVEL SWITCH

FIELD OF THE INVENTION

This invention relates to level sensing instruments and, more particularly, to a capacitance level sensing instrument including a self-testing feature.

BACKGROUND OF THE INVENTION

Various instruments have found use for applications requiring level sensing of, for example, a liquid or bulk material in a vessel. Such instruments include float sensors, ultrasonic level sensors and capacitance-type level sensors. With any such instrument it is desirable that the instrument be reliable and provide repeatable measurements, as well as being simple to install and calibrate.

With a capacitance-type level sensor, the instrument includes a circuit connected to a probe adapted to be disposed in a material containing vessel. The probe exhibits capacitance. Capacitance increases as part of the probe is surrounded by material of dielectric constant greater than one. The capacitance present between the probe and the vessel can be measured to determine level of the material in the vessel.

A capacitance point level switch is operable to sense a specific level of the material in the vessel and provide a discrete output, such as with a relay contact, when the material is at a sufficient level to cause the capacitance between the probe and the reference to exceed the specific level. To assure accuracy, it is desirable that such levels be easily selected in the instrument.

The present invention is intended to satisfy the above requirements.

SUMMARY OF THE INVENTION

In accordance with the present invention, a level sensing instrument is provided which includes a self-test feature to verify instrument integrity.

Broadly, there is disclosed herein an instrument for sensing level of a material in a vessel comprising a variable capacitor having an electrode being a probe adapted to be immersed in the material, the capacitance of which is a function of material level in the vessel. An oscillator circuit is operable to develop an output signal having a period which is dependent upon an input capacitance. A switching circuit is connected to the variable capacitor and to the oscillator circuit for selectively connecting the probe to the oscillator circuit to measure the variable capacitance. A determining circuit is connected to the oscillator circuit to determine the period of the output signal and includes self-test means controlling operation of the switching circuit to periodically disconnect the probe from the oscillator circuit for testing the existence of a shorted probe or an open probe condition.

It is a feature of the invention that the self-test means includes a charge circuit for charging the variable capacitor when the probe is disconnected from the oscillator circuit and a comparator sensing level of charge of the variable capacitor to determine existence of a shorted probe.

It is another feature of the invention that the self-test means includes means for comparing period of the output signal with the probe connected and disconnected to determine existence of an open probe condition.

In accordance with another aspect of the invention, a reference capacitor is provided connected to the switching circuit and the self-test means controls operation of the switching circuit to periodically connect the reference capacitor to the oscillator circuit for testing response of the oscillator circuit.

It is yet another feature of the invention that the self-test means includes a charge circuit for charging the variable capacitor when the probe is disconnected from the oscillator circuit, a comparator senses level of charging of the variable capacitor to determine existence of a shorted probe and a switch means is driven by the comparator for selectively disconnecting the oscillator circuit from the determining circuit responsive to existence of a shorted probe.

In accordance with one aspect of the invention the oscillator circuit, the switching circuit and the determining circuit are contained in an integral housing.

In accordance with another aspect of the invention the oscillator circuit and the switching circuit are contained in a first housing and the determining circuit is contained in a second housing.

It is yet another feature of the invention that the determining circuit comprises a programmed microprocessor.

It is still another feature of the invention that a relay circuit is provided driven by the determining circuit for developing discrete outputs responsive to material level in the vessel being above or below select values.

It is still yet a further feature of the invention to provide a calibration circuit connected to the determining circuit and including a display for displaying information related to period of the output signal and switches actuable by an operator to enter calibration information related to span and zero values of the period.

It is still yet a further feature of the invention that a counter is connected between the oscillator circuit and the determining circuit for converting the output signal to a lower frequency signal.

In accordance with another aspect of the invention there is disclosed an instrument for sensing level of material in a vessel comprising a variable capacitor having an electrode being a probe adapted to be immersed in a material, the capacitance of which electrode is a function of material level in the vessel. An oscillator circuit is operable to develop an output signal having a period which is dependent upon an input capacitance. A determining circuit is connected to the oscillator circuit to determine the period of the output signal and including a counter means for counting a time duration for receiving a plurality of pulses and dividing said time duration by a factor related to the number of said pulses to determine an average pulse period.

It is a feature of the invention that the determining circuit includes averaging means for storing an accumulation value of periods for a select number of average pulse periods and the storing means is periodically updated with a most recent average pulse period to obtain a running average of the pulse period.

It is a further feature of the invention that the averaging means includes means for comparing a difference between the most recent average and the running average to a select level and replacing the running average with the most recent average if the difference is greater than the select level.

More specifically, there is disclosed herein an instrument which senses capacitance of a material in a vessel to determine level. The capacitance is input to a comparator which is part of an oscillator circuit developing a square wave signal having a period corresponding to capacitance. A binary counter divides the square wave to provide a signal of lower frequency which is input to a microprocessor. The microprocessor includes a programmed counter which determines the period of four pulses to determine an average period. The microprocessor drives relay circuits providing discrete outputs according to specific precalibrated levels to be sensed.

The instrument is calibrated using an internal keypad and display. The operator enters known high and low level values corresponding to actual high and low levels of probe immersion. The two measured capacitance values, related to the actual levels, and operator entered values are used to define a straight-line curve for subsequent capacitance measurement. The relays are calibrated by entering high and low trip values.

The point sensor includes a self-test mode which operates periodically to test the shorting of the probe, expected frequency response and an open probe. At the start of the test mode a switch is opened to disconnect the probe from the oscillator. The probe remains connected through a known resistance to the power supply. A comparator senses probe voltage relative to a reference to determine if a short exists. At the same time, a reference capacitor is connected to the oscillator in place of the probe and the circuit determines if the period corresponding to the known capacitance is correct. Next, the second switch is opened so that no capacitance is input to the comparator. The change in capacitance should produce a known change in period which is also evaluated. Lastly, the last measured period with the probe connected is compared to the period evident with no capacitance connected. Unless there is a minimum difference, representing capacitance of bare rod in free space, the probe is assumed to be open.

Further features and advantages of the invention will readily be apparent from the specification and from the drawings.

DESCRIPTION O THE INVENTION

Figure 1:
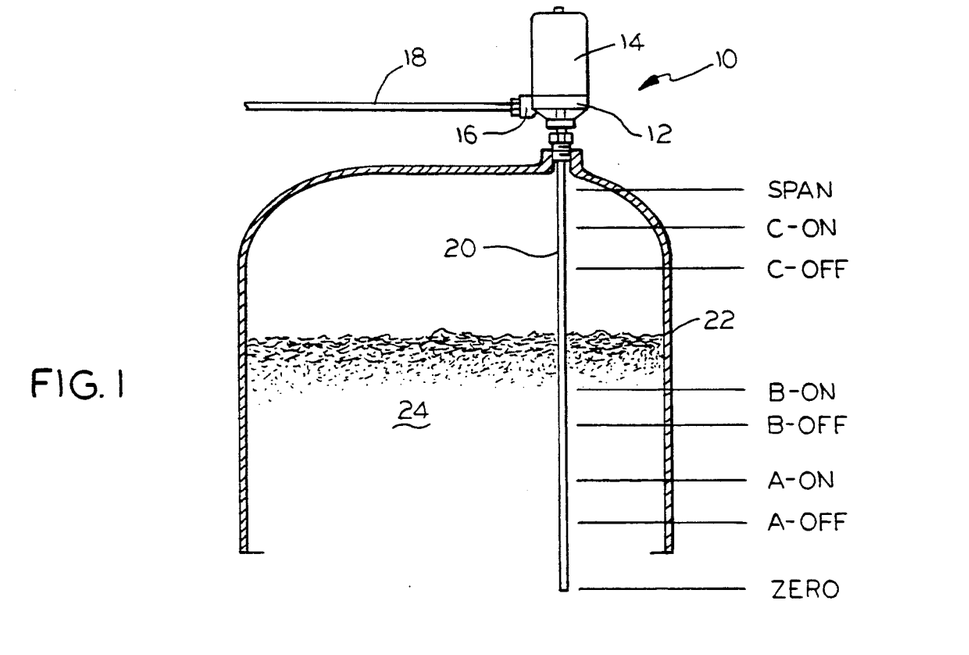
FIG. 1 is a side view of an integral capacitance point level switch according to the invention mounted to a material containing vessel.
Figure 2A:
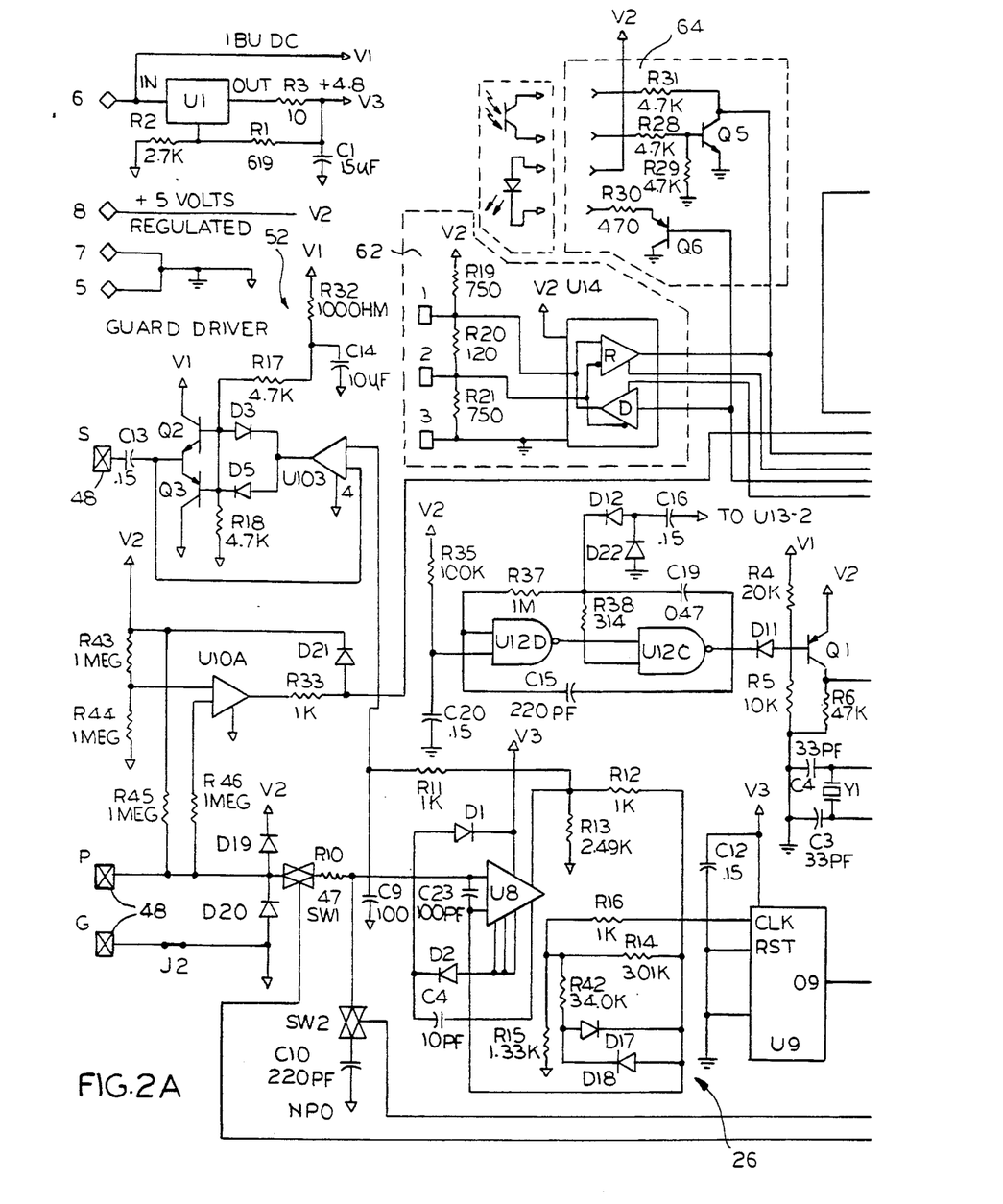
FIG. 2A,B is an electrical schematic diagram illustrating an amplifier and an oscillator circuit for the switch of FIG. 1.
Figure 2B:
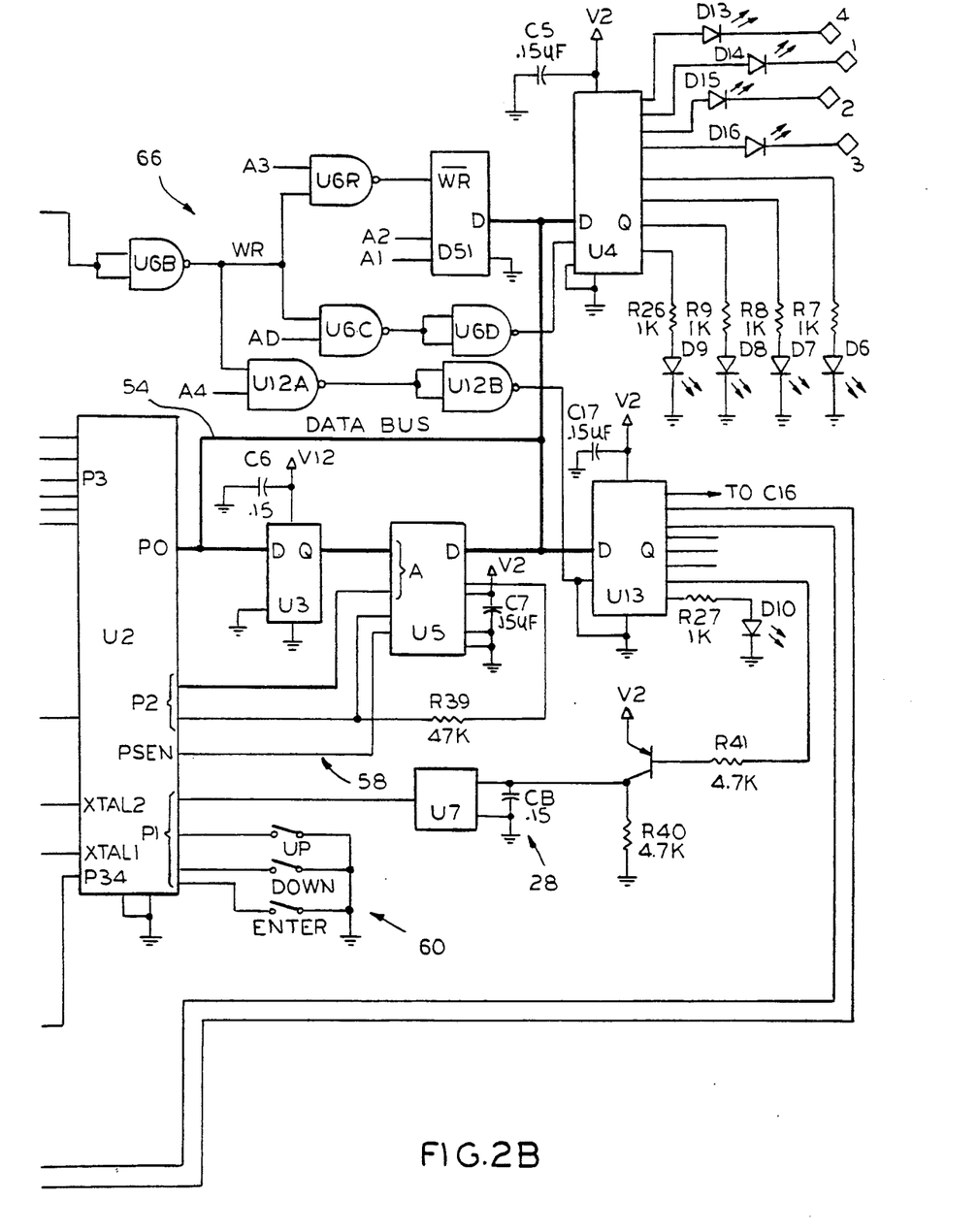

With reference to FIG. 1, there is illustrated an integral capacitance point level switch 10 according to the invention. The switch 10 includes a housing base 12 and cover 14 for enclosing circuit components described more specifically below relative to the schematic of FIG. 2. A threaded connection 16 is included on the base 12 for connecting to a conduit 18 for carrying electrical conductors for connecting to external circuitry.

Threadably connected to the housing base 12, using suitable insulation materials, is a probe 20. In accordance with the illustrated embodiment of the invention, the probe 20 may comprise a guarded probe including guard shield, as is well known.

The switch 10 is adapted to be mounted to a vessel 22 containing a material 24, the level of which is to be sensed. The material 24 acts as a dielectric with the capacitance between the probe 20 and vessel 22 varying as a function of the level of the material 24. Particularly, a variable capacitance is formed between two electrodes, one of the electrodes being the probe 20 and the other electrode being the vessel wall 22 assuming it is conductive. If the vessel 22 is not conductive, then a suitable reference electrode must be provided, as is conventional.

In accordance with the invention, the switch 10 is operable to sense a plurality of discrete levels of the material 24 in the vessel 28 utilizing a circuit responsive to capacitance of the material 24, as discussed below. Particularly, the instrument 10 is calibrated to sense capacitance above a select zero level and over a selected span range. The zero level might be, for example, the tip of the probe, illustrated by the line "ZERO", while the span is the difference between the "ZERO" line and any select height, such as the height represented by the line labelled "SPAN." If the instrument 10 is selected to provide point level control for three discrete levels, then the switch is calibrated to provide discrete switching at levels based on sensed capacitance for each of the three points. The select "ON" and "OFF" levels for three points, A, B and C are illustrated in FIG. 1. As is apparent, any of the "ON" and "OFF" levels can be user calibrated, as well as the failsafe mode of operation.

Figure 3:
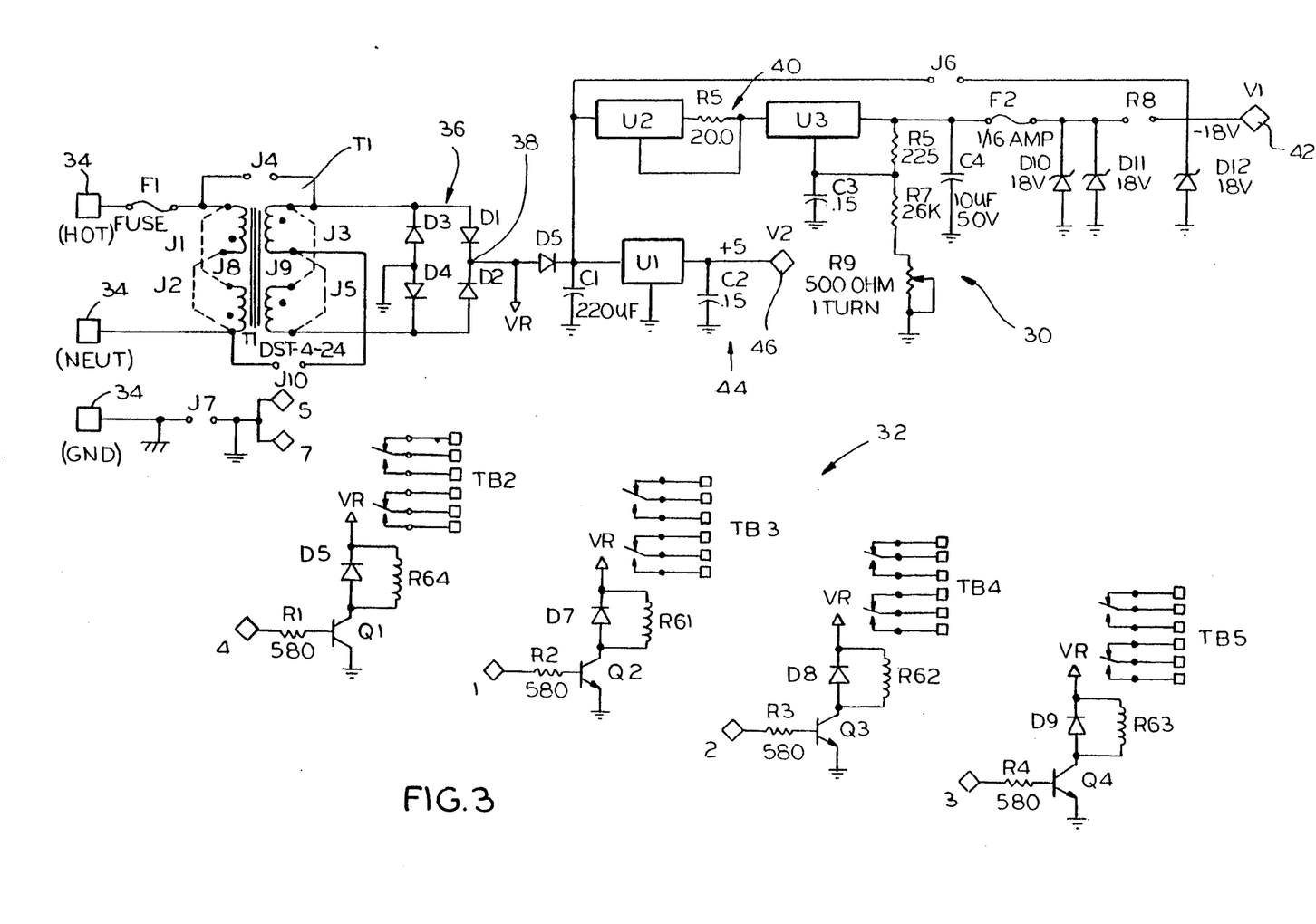
FIG. 3 is an electrical schematic diagram illustrating a power supply and a relay drive circuit for the switch of FIG. 1.

With reference to FIGS. 2 and 3, schematic diagrams illustrate circuits used in the instrument 10. Particularly, the instrument 10 includes an oscillator circuit 26, a switching circuit 27 and a processing circuit 28, see FIG. 2, and a power supply circuit 30 and a relay output circuit 32, see FIG. 3.

The power supply circuit 30 receives one hundred twenty volts AC input power at terminals 34. The power is stepped down through a transformer T1 and rectified in a bridge rectifier circuit 36 comprising diodes D1-D4 to provide DC voltage at a node 38. The node 38 is connected to a first regulator circuit 40 for developing regulated power labelled V1 at a node 42 and through a second regulator circuit 44 for developing lower voltage rectified power labelled V2 at a node 46. The V1 power may be on the order of eighteen volts DC, while the V2 power may be on the order of five volts DC.

With reference again to FIG. 2, the terminals 48 labelled P, G and S are provided for connection to the probe electrode, ground reference and probe shield, if included, respectively. The probe 20 is selectively connected via the switching circuit 27 to the oscillator circuit 26. Specifically, the terminal P is connected through an analog switch SW1 and a resistor R10 to the inverted input of a comparator U8. The ground terminal G is connected to circuit ground. An output of the comparator U8 is connected via a resistor R16 to the clock input of a binary counter U9. A feedback circuit 50 provides stabilized operation. A capacitor C9 is also connected between ground and the inverted input of the comparator U8 to provide a minimum pulse period, as discussed below.

The oscillator circuit 26 operates so that when the output is high the variable capacitance between the P and G terminal, provided by the material in the vessel, is charged. When the variable capacitance charges to a sufficient level, the comparator U8 switches and the variable capacitance discharges. A voltage divider formed by resistors R12 and R14 sets a reference level. The reference level switches between approximately $\frac{1}{3}$ and $\frac{2}{3}$ of supply voltage.

The comparator U8 and its associated circuitry form a free-running multi-vibrator, the period of which is determined in part by the capacitance between the probe and ground. Particularly, the output from the comparator U8 is a rectangular signal supplied to the clock input of the binary counter U9. The binary counter U9 may be, for example, a type 4040. 12-stage binary counter which in the illustrated embodiment of the invention is configured to divide the clock signal by 512 and transmit a lower frequency pulse signal on a line 51. The minimum pulse period is set by the capacitor C9 and other fixed components, as is apparent. In accordance with the invention, the oscillator circuit 26 may operate at a frequency on the order of one to two megahertz, said frequency decreasing with increasing probe capacitance.

A guard driver circuit 52 is connected between the probe terminal and the shield terminal so that the potential between the probe element and the guard shield is always made equal to zero, as is well known.

To determine period of the square wave and thus capacitance, the output of the binary counter U9 is input to a terminal of port 3 of a microprocessor U2. In the illustrated embodiments of the invention, the microprocessor U2 comprises an Intel 80C51FA CHMOS single-chip eight-bit microcomputer.

Port zero of the microprocessor U2 forms a multiplexed, low-order address and data bus 54. The bus 54 is connected to an address decoder, comprising a type 373 latch circuit, U3 to develop address signals on an address bus 56. The address bus 56 is connected to address ports of a programmable read-only memory (PROM) circuit U5. The PROM U5 also receives address information on an address bus 58 from port two of the microprocessor U2. Data to and from the PROM U5 is transmitted via the bus 54. The bus 54 is also connected to transmit data to type 373 latch circuits U4 and U13 and to a display DS1. A logic circuit 66 is connected to the address bus 56 and to port 3 of the microprocessor U2. The logic circuit 66 gates the latch circuits U4 and U13, as well as the display DS1 under program control. The latch circuit U4 includes outputs for driving relay circuits 32, see FIG. 3, and indicator LEDs D6–D9. The latch circuit U13 drives the switching circuit 27. The switching circuit 27 includes the switch SW1 as well as a second SW2 which connects a reference capacitor C2 from ground to the inverting input of the comparator U8, for purposes discussed below.

The PROM U5 provides program storage, while an electrically erasable PROM U7 connected to port one of the microprocessor U2 stores data keyed in by a user keypad 60 using "UP", "DOWN" and "ENTER" keys, also connected to port one. The display DS1 comprises a four-digit LED display which provides information on the status of operation of the instrument 10 used during calibration and setup and the like.

The relay circuit 32, see FIG. 3, includes four relays RL1–RL4 connected via nodes 1–4 to the latch circuit U4, see FIG. 2. These relays provides contact outputs to external devices used, for example, for indicating alarm conditions or turning external control elements on or off, as is well known.

Port three of the microcomputer U2 is also connected to a serial IO circuit 62 and to an opto IO circuit 64. The serial IO circuit 62 can be used for communication with a host microprocessor, while the opto IO circuit 64 can be used for connection to an external calibration instrument, as is necessary or desired.

Figures 4, 5:
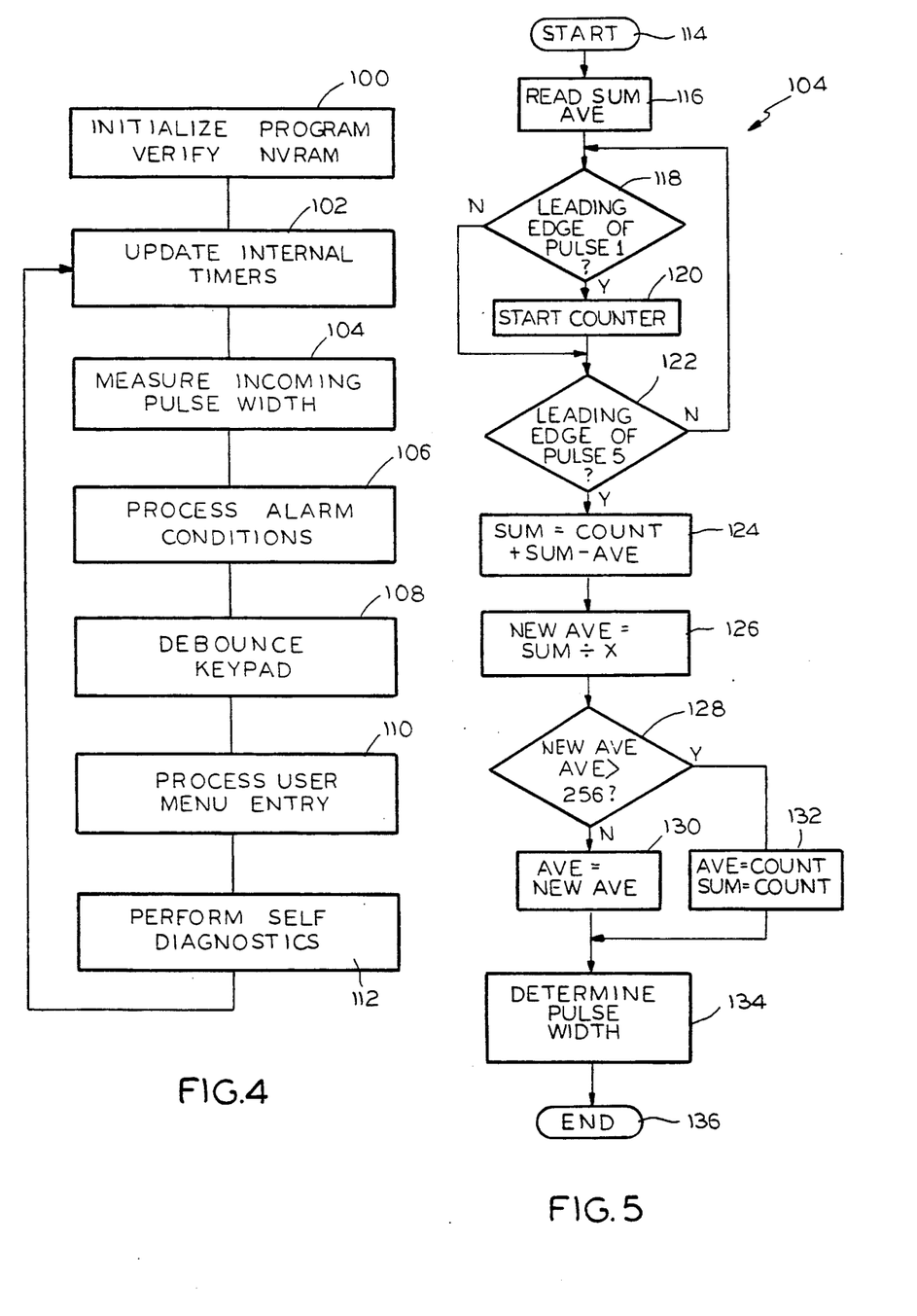
FIG. 4 is an overall system software flow diagram illustrating cyclical operation of a program implemented by the microprocessor of FIG. 2.
FIG. 5 is a software flow diagram illustrating operation of a pulse width measurement program.

With reference to FIG. 4, a flow chart illustrates operation of the main control program implemented in the microprocessor U2. Control begins at a block 100 which is performed during initialization of the system to initialize the program and verify the memory U7. Next, at a block 102, all internal timers are updated. At a block 104 the pulse width of the output signal on the line 51 from the oscillator 26 is measured, as discussed in greater detail below relative to the flow chart of FIG. 5. At a block 106, the alarm conditions are processed, as discussed in greater detail below relative to FIG. 6. At a block 108, a debounce keypad routine is performed relative to receiving input from the user keypad 60, see FIG. 2. At a block 110, any user entries are then processed and suitable parameters stored in memory. Finally, at a block 112, a self-diagnostics routine, discussed more specifically below relative to FIG. 7, is performed and control then returns to the block 102.

The routines performed at the blocks 108 and 110 are generally used during calibration or testing. Particularly, the input signal from the probe must be calibrated as well as the "ON" and "OFF" point levels for the relays R1–R4, see FIG. 3. Probe calibration is performed by filling the vessel 22, see FIG. 1, to two distinct levels and at each level using the keypad 60 to increment or decrement an indicator value representing the particular level. Particularly, each entered level will correspond to a pulse width received on the line 51. A straight-line method of calculation can then be used to define a relationship between pulse width, i.e., capacitance, and level in the vessel 22. The on and off trip points for each of the relays RL1–RL4, as well as the fail-safe mode, can also be selected using the up and down switches on the keypad 60 for selecting desired levels. The display DS1 can also be used to provide a continuous readout of tank level based on the pulse width input value.

With reference to FIG. 5, a flow diagram illustrates the routine 104 implemented by the microprocessor U2 for measuring incoming pulse width to determine level. The routine starts at a block 114 and proceeds to a block 116 which reads memory stored values for a sum and average, or AVE. In accordance with the invention, the microprocessor U2 performs two distinct methods of averaging to provide for accurate level measurement and to minimize effects of noise and the like. The first form of averaging is done by measuring the period of four consecutive pulses, rather than just a single pulse. Also, a running average is obtained by using a user selectable number of average measurements for determining level. For example, using the keypad 60, the user can precalibrate the instrument so that it averages one, two, four, eight, sixteen or thirty-two measurements for a running average. The AVE register stores the pulse width for the most recent average (representing four pulses), while the SUM register stores an accumulation for the X most recent average measurements, the value X being user determinable, as discussed above.

Control proceeds to a decision block 118 which determines whether or not the output signal on the line 51 is at the leading edge of a first pulse in a series of pulses to be measured. If so, then control advances to a block 120 to start a counter. Thereafter, or if the signal is not at the leading edge of pulse one, then control advances to a decision block 122 which determines if the signal is at the leading edge of pulse five. If not, then control returns to the decision block 118. This routine causes the counter to count the number of clock cycles between the leading edge of the first pulse and the leading edge of the fifth pulse in succession to determine the total time for four pulse cycles. As the signal is a fifty percent duty cycle signal, the counter can be divided by four to determine the period of the pulse signal. Once control determines that the signal is at the leading edge of pulse five, then at a block 124 the SUM register is updated by adding the count value to the previous value in the SUM register and subtracting the value in the AVE register. This routine provides an accumulation of the average values for the last X measurements without requiring memory storage to store as many as thirty-two past count values. Thereafter, at a block 126, the new average is determined by dividing the value in the SUM register by user selected variable X.

At a decision block 128 control determines if the new average, determined at the block 126, is greater than the previous average, read at the block 116, by an amount greater than 256, which in the illustrated embodiment represents approximately 2,140 picofarads. Particularly, if the new average is greater than the previous average by a set amount, then the previous average is ignored and the system resets using the newly measured value. This is performed so that if a quick change in level occurs then the instrument can respond quickly rather than waiting for delay resulting from the running average selection. If the new average is not greater by an amount of 256, then at a block 130 the new average is stored in the AVE register. If so, then the count value is stored in the AVE register at a block 132 and the SUM register is also rewritten with the count value to provide a new running average. In either case, control advances to a block 134 which determines the pulse width as by dividing the average value by four. This pulse width represents the capacitance formed by the variable capacitance of the material in the vessel, thus indicating level of the same. The routine then ends at a block 136.

Figure 6:
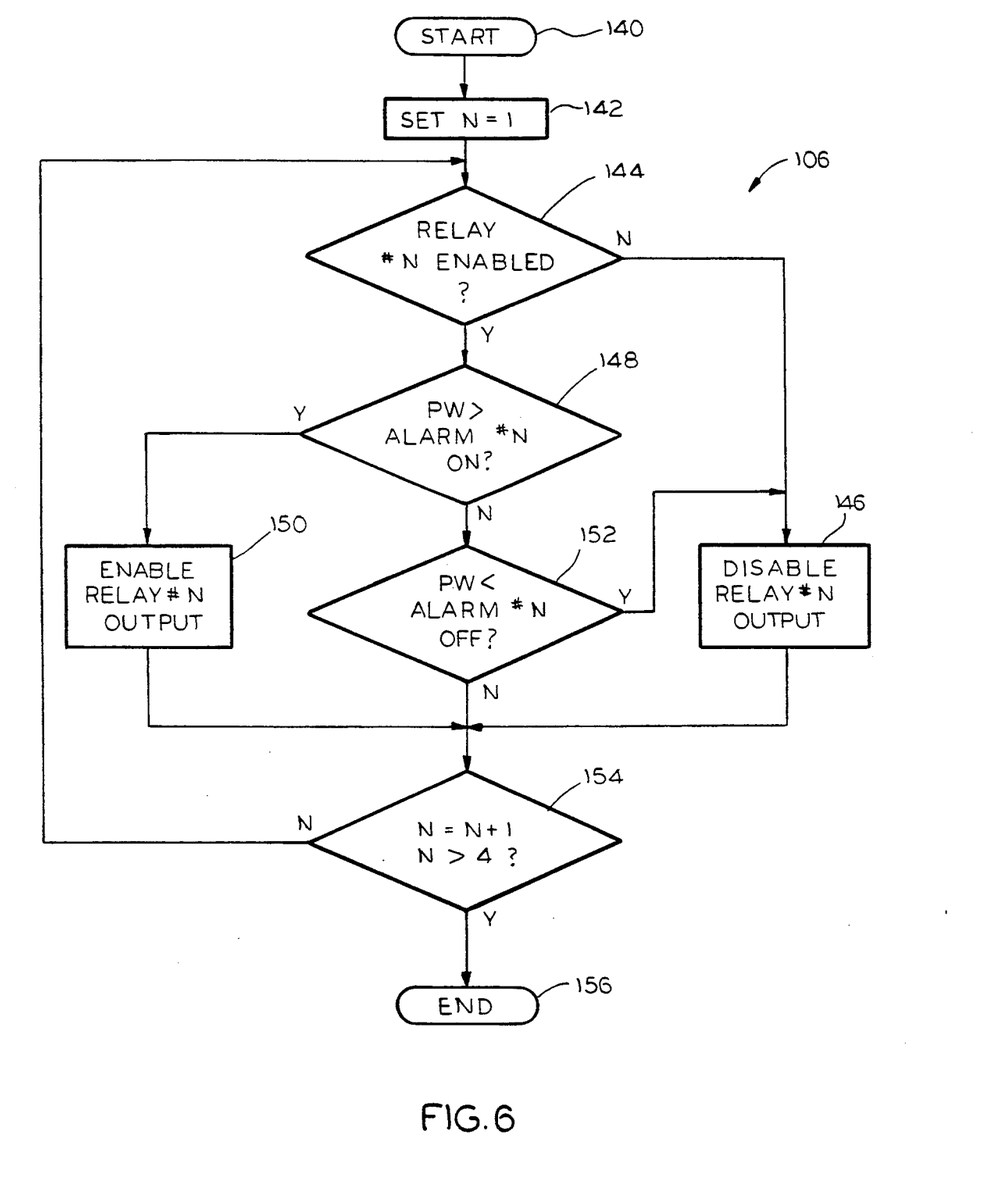
FIG. 6 is a software flow diagram illustrating operation of an alarm processing program.
Figure 7:
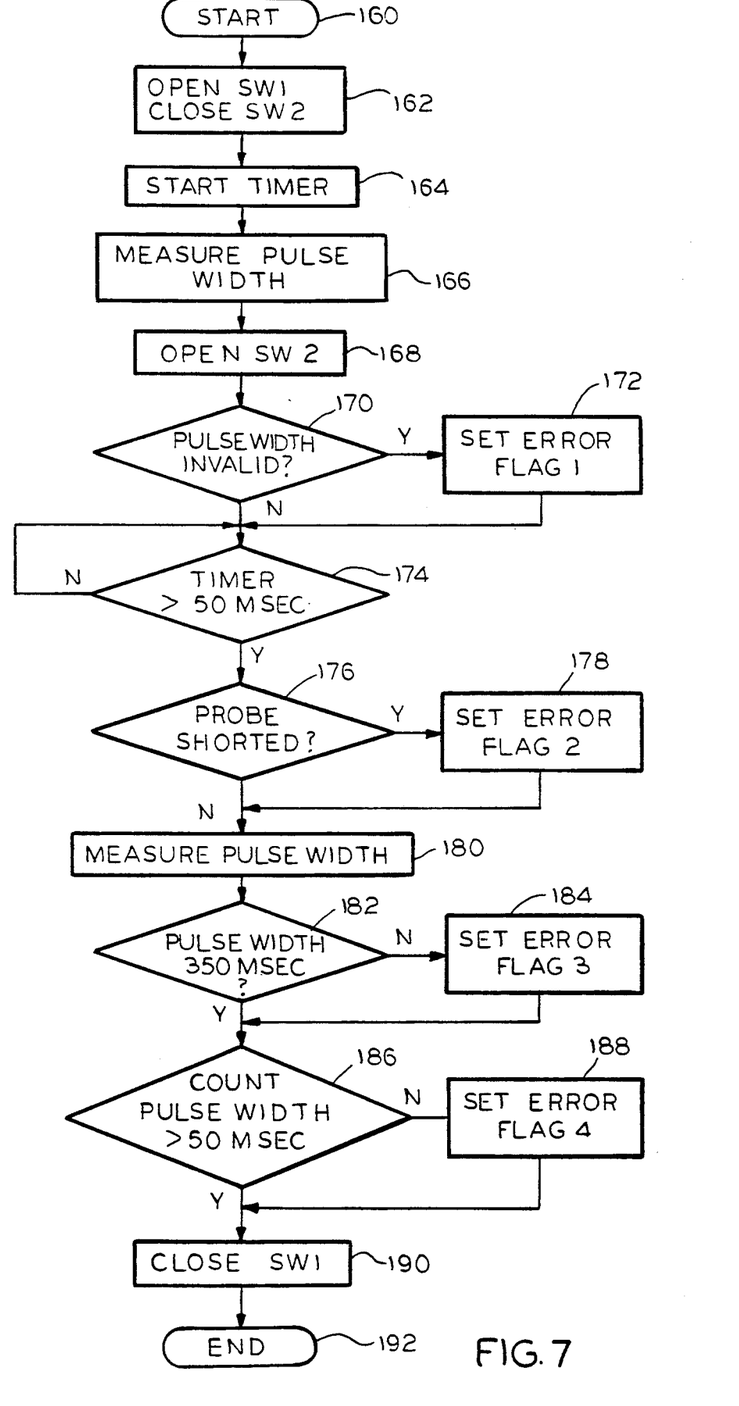
FIG. 7 is a software flow diagram illustrating operation of a self-diagnostics program.

With reference to FIG. 6, a flow chart illustrates operation of the program 106, see FIG. 4, performed in the microprocessor U2 for processing alarm conditions. Control begins at a start block 140 and then proceeds to a block 142 which is operable to set a variable N equal to one. The variable N represents the number of the relay which is processed during a particular pass through the flow chart. A decision block 144 determines if relay number N is enabled. During the calibration process, the user can selectively enable or disable any relay according to its needs in the system. If not enabled, then control advances to a block 146 which disables the output from the latch circuit U4 for the particular relay. If the relay is enabled, then control advances to a decision block 146 which determines whether the pulse width is greater than the alarm "ON" value for the particular relay. If so, then control advances to a block 148 to enable the relay output for the particular relay in the latch circuit U4. If the pulse width is not greater than the alarm value, then the decision block 152 determines if the pulse width is less than the alarm "OFF" value. If so, then control proceeds to the block 146 to disable the output for the particular relay. If not, or from either block 146 or 150 control advances to a decision block 154 which increments the N value by one and then determines if N is greater than or equal to four. If so, the routine ends. If not, then control returns to the decision block 144 to process the alarm condition for the next successive relay. As is apparent, depending upon the fail-safe mode of any particular relay, the enable or disable function of the relay may be opposite to that discussed above.

With reference to FIG. 7, a flow diagram illustrates operation of a routine performed by the microprocessor U2 for performing a self-diagnostics mode of operation. The self-diagnostics routine is performed periodically, for example once per ten seconds of operation, to test for shorting of the probe 20, expected frequency response, and to check for an open probe 20.

The routine starts at a block 160. Thereafter, at a block 162 the microprocessor U2, via the latch circuit U13, commands the switch SW1 to open and the switch SW2 to close to disconnect the probe 20 from the oscillator circuit 26. Upon closing the switch SW2 the reference capacitor C10 is instead connected to the oscillator circuit 26. A timer is started at a block 164. At a block 166 the pulse width resulting from the reference capacitor C10 is measured and at a block 168 the switch S2 is subsequently commanded to open. A decision block 70 then determines if the pulse resulting from the reference capacitor C10 is invalid. If so, then an error flag one is set at a block 172. Particularly, a known capacitance value should produce a known pulse signal, as is well known.

Thereafter, control waits at a decision block 174 until fifty milliseconds have passed. During such time, the probe 20 remains connected to the V2 supply via a resistor R45, see FIG. 2. The probe 20 is also connected via a resistor R46 to a comparator U10a. The comparator U10a compares the voltage on the probe to supply. Under normal circumstances the variable capacitance, of which the probe is a part, will charge up to the supply. If a leakage resistance is present, such as with shorting of the probe, then owing to the resistor R45 the variable capacitor will not charge up causing the output of the comparator U10a to go high. At a decision block 166 a determination is made if the probe is shorted, as by determining if the output of the comparator U10a, which is connected to port 3 of the microprocessor U2, goes high. If so, then error flag 2 is set at a block 178.

If the probe is not shorted as determined at the block 176, or after the error flag is set at the block 178, then control advances to a block 180 which measures the pulse width. As both switches SW1 and SW2 are open the pulse width should correspond to the minimum capacitance provided by the capacitor C9. Thus, at a decision block 182 a determination is made if the pulse width is less than 350 microseconds, corresponding to the pulse width provided by the capacitor C9. If not, then error flag 3 is set at 184. In either event, a decision block 186 then evaluates the last measured period with the probe connected, which comprises the value in the count register, see FIG. 5, to the pulse width measured at block 180. Unless there is a minimum difference, representing capacitance of a bare rod in free space, then the probe is assumed to be open. If the probe is open, then an error flag 4 is set at a block 188. In any event, thereafter at a block 190, the switch SW1 is closed to again connect the probe 20 to the oscillator circuit 26 and the routine then ends at a block 192.

If any of the above error flags are set, then a suitable indication of the same can be provided on the display DS1 to provide an indication to the operator, as well as being transmitted via the serial IO circuit 62 to any external supervisory device. Additional error flags can also be used for verifying other operating parameters of the instrument 10, as is apparent.

Thus, in accordance with the invention, the instrument 10 is capable of providing a dual averaging function for measuring level, as well as periodically implementing a self-test operation for verifying integrity of the instrument 10.

Figure 8:
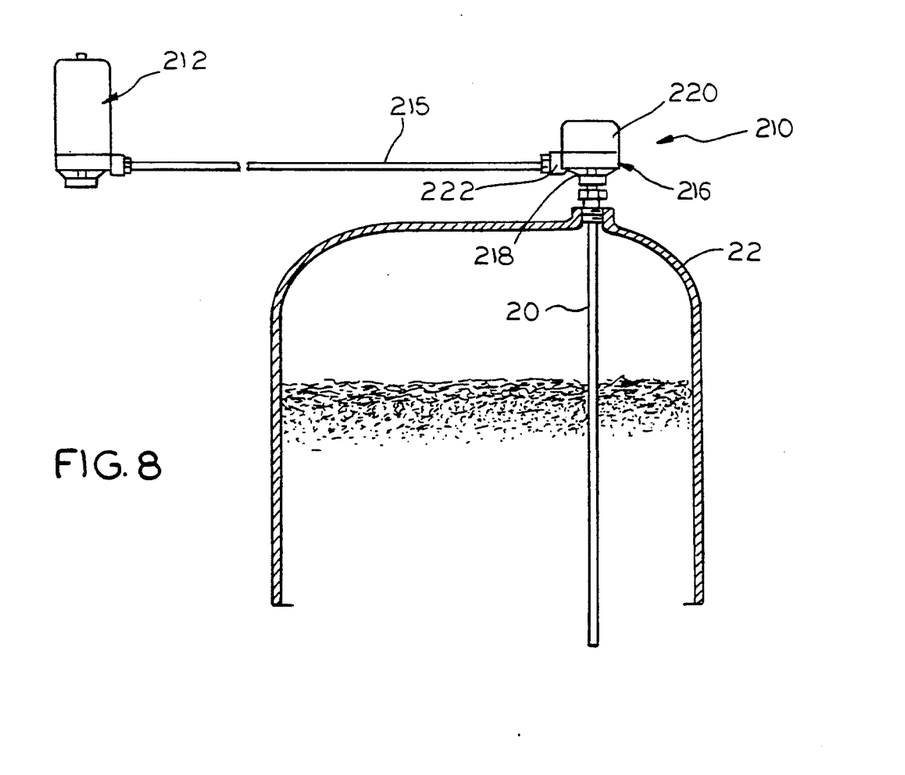
FIG. 8 is a side view of a remote capacitance point level switch according to another embodiment of the invention.

With reference to FIG. 8, a capacitance instrument 210 according to a second embodiment of the invention is illustrated. The capacitance instrument 210 is generally similar to the instrument 10 shown in FIG. 1, except being provided in a remote version. For simplicity, where like elements correspond to those discussed above relative to any of FIGS. 1-7, like alpha-numeric reference designators are used.

Figure 9A:
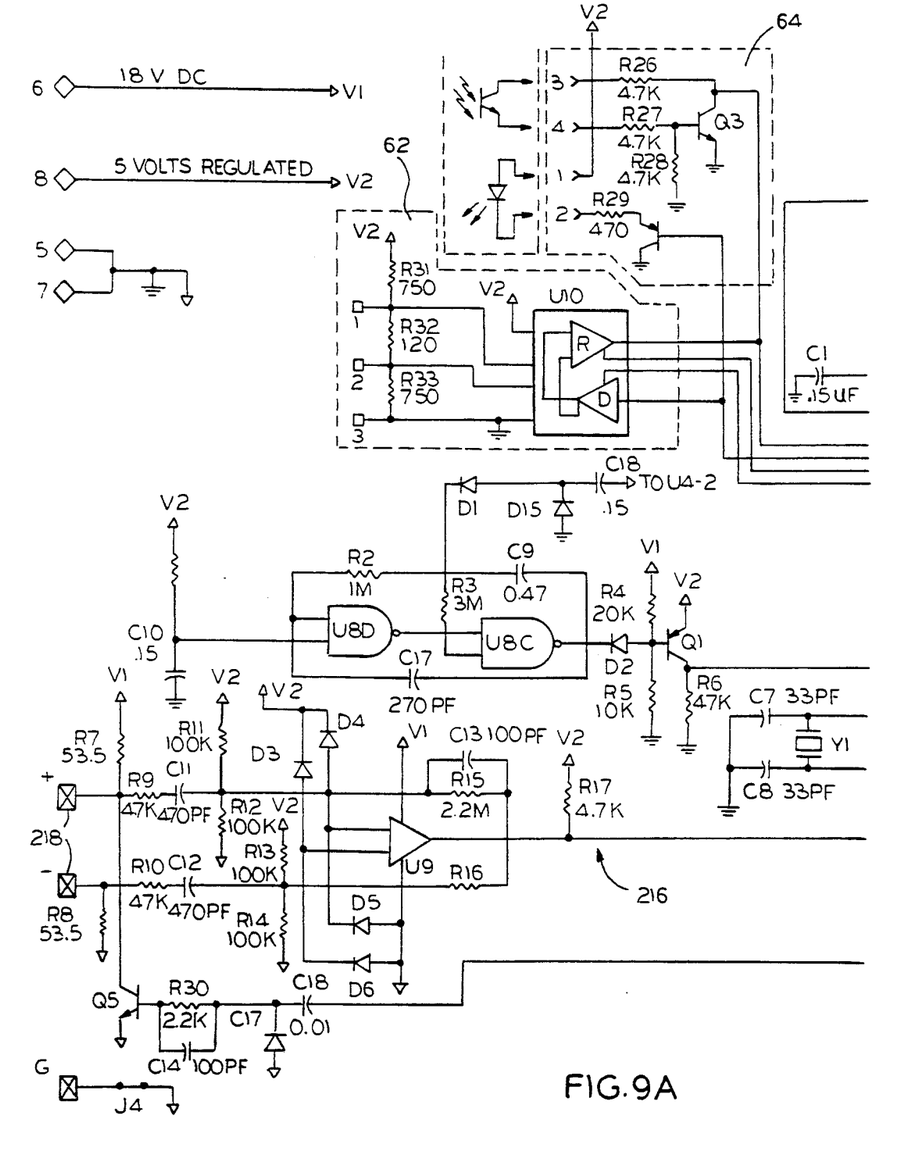
FIG. 9 is an electrical schematic diagram illustrating an amplifier circuit for the switch of FIG. 8.
Figure 9B:
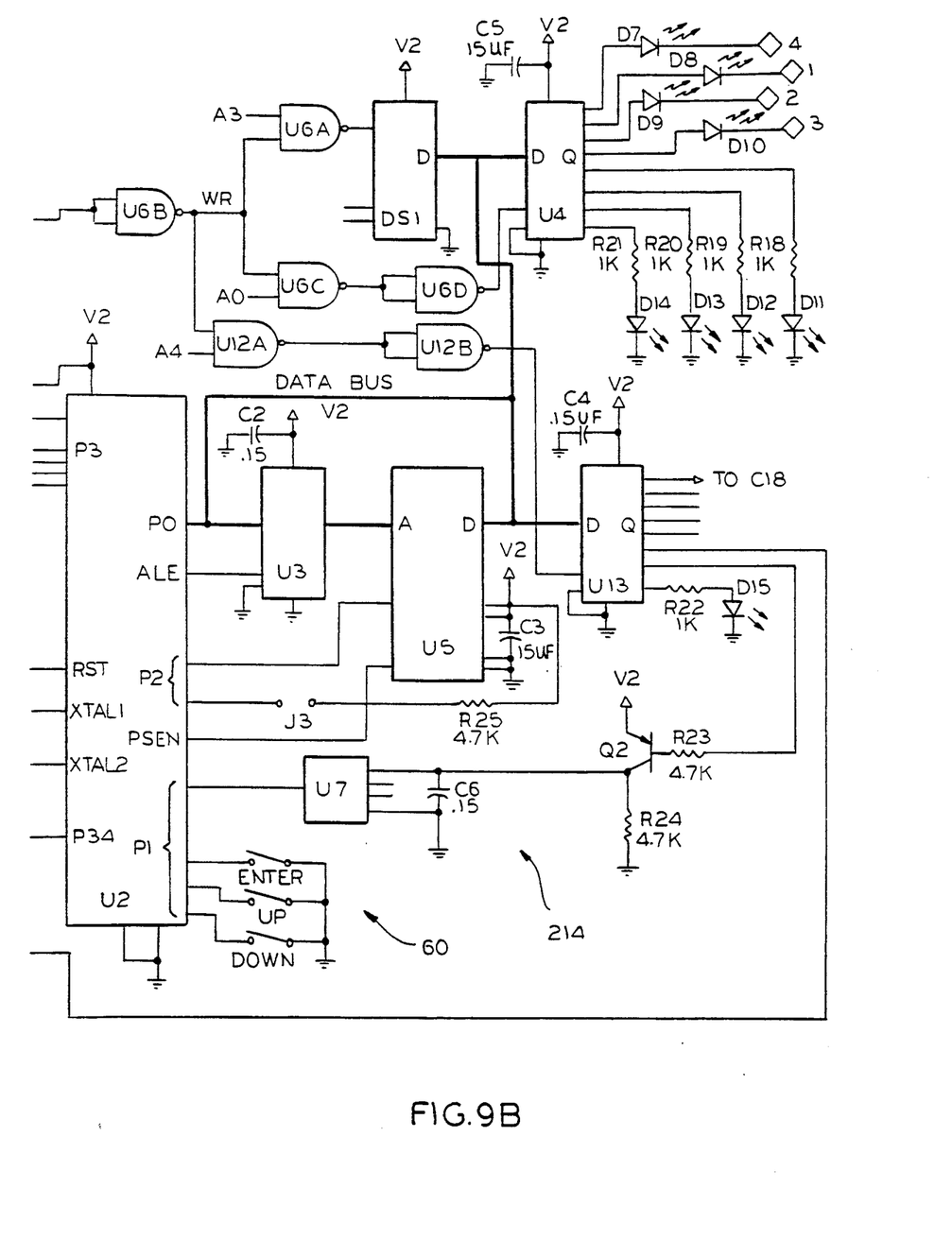

The instrument 210 includes a centrally located housing 212 housing components for a processing circuit 214, see FIG. 9, as well as the power supply circuit 30 and relay circuit 32, see FIG. 3. Particularly, the relay circuit 32 and power supply circuit 30 discussed above are identical for the remote and integral versions. A conduit 215 connects the central housing with a remote housing 216. The remote housing 216 includes a base 218 and cover 220. A conduit port 222 in the base 218 accepts the conduit 215. The remote housing 216 houses components for an oscillator circuit 224, see FIG. 10, and a switching circuit 226. The probe 20 is threadably connected to the remote housing base 218, as above.

With reference to FIG. 9, the processing circuit 214 is virtually identical to the processing circuit 28, see FIG. 2. Therefore, the circuit will not be discussed in detail. The principal difference is the use of an interface circuit 216 for interfacing the microprocessor U2 to the remotely located oscillator circuit 224 and switching circuit 226, see FIG. 10. Power from the power supply circuit 30 in the central housing 212 is transmitted to the remote housing 216 by V1 power and ground being connected through respective resistors R7 and R8 to plus and minus terminals 218. Suitable conductors through the conduit 214, see FIG. 8, connect to corresponding plus and minus terminals 220 in the remote housing, see FIG. 10. A voltage regulator VR1 provides regulated power for the switching circuit 226 and the oscillator circuit 224.

Figure 10:
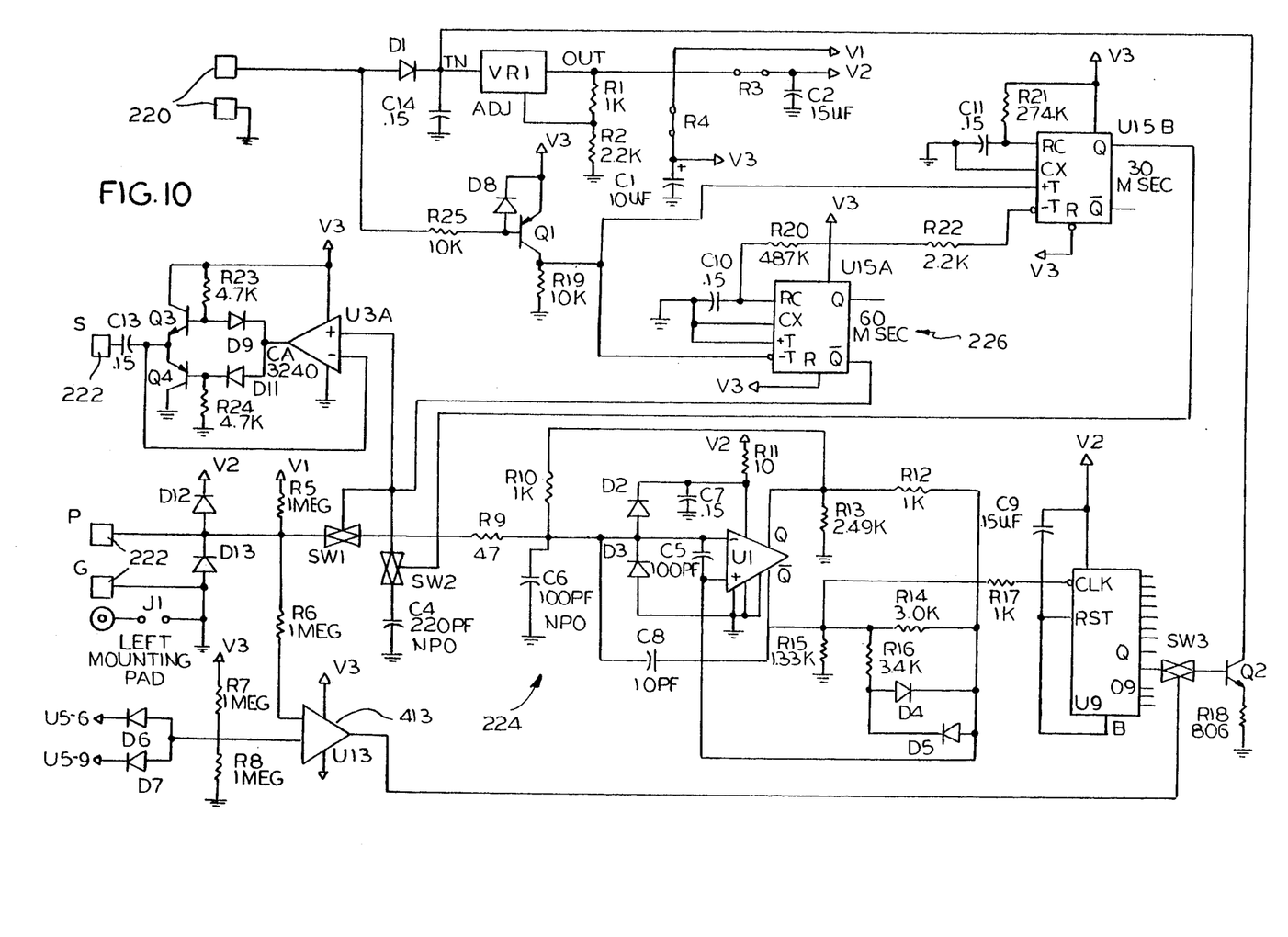
FIG. 10 is an electrical schematic diagram illustrating an oscillator and switching circuit of the switch of FIG. 8.

The oscillator circuit 224 is generally similar to the oscillator circuit 26 discussed above relative to FIG. 2. The oscillator circuit includes a comparator U1 having its inverted input connected via a resistor R9 and the switch SW1 to the probe electrode. Particularly, terminals 222 labelled P, G and S are provided for the probe, ground and shield, respectively. The probe ground is connected to circuit ground. The inverted output of the comparator U1 is connected via a resistor R17 to the clock input of the binary counter U9. The output of the comparator U1 is an approximate square wave having a period which varies linearly proportional to capacitance between the P and G electrodes. A capacitor C6 also connected to the inverted input of the comparator U1 provides for minimum period of the oscillator square wave. The binary counter U9 divides the square wave by 512 to provide a lower frequency square wave.

The Q9 output of the counter U9., rather than being connected during to the microprocessor U2, see FIG. 9, is output via an analog switch SW3 to the base of a transistor Q2. The emitter of the transistor Q2 is connected via a resistor R18 to ground. The collector is connected via a diode D1 to the plus terminal 220. The transistor Q2 serves as a current source from the output of the binary counter U9. When the output of the counter U9 is high a current set by the emitter resistor R18 is superimposed on supply voltage to be reflected back to the interface circuit 216, see FIG. 9. The period of the superimposed square wave is proportional to capacitance sensed by the probe.

With reference again to FIG. 9, the interface circuit 216 includes a dual input comparator U8 connected via AC isolation capacitors C11 and C12 to the plus and minus terminals 218. The plus and minus terminals include a voltage difference of approximately 18 volts DC and a carry an operating current on the order of 45 milliamps with the superimposed square wave adding approximately five milliamps during half of the cycle. The leads from the plus and minus terminals are DC biased at the same voltage. The output of the comparator U8 is a square wave on a line 226 input to port P3 of the microprocessor U2.

The differential comparator U8 could be replaced with a single ended comparator. However, a differential comparator provides improved noise immunity. The diodes D3–D6 clamp the comparator inputs in case of transients.

The operation of the programs performed in the microcomputer U2 in the remote version are generally similar to those performed in the integral version discussed above. Particularly, the flow charts of FIGS. 4–6 are identical. However, because the microcomputer U2 does not control the analog switches directly, the self-diagnostics program is different.

With the remote unit the self-test routine is initiated by the microprocessor U2 pulling the power supply to ground for approximately twenty microseconds by switching on a transistor Q5 which has its base connected to the latch U13. With reference also to FIG. 10, when the power supply is pulled to ground a transistor Q1 is tripped to trigger one-shots U15A and U15B. The inverted output of the first one-shot U15A, which is configured to provide a sixty millisecond pulse, is connected to the analog switch SW1. The non-inverted output of the second one-shot U15B is connected to operate the second switch SW2. Thus, when the self-test mode is initiated the switch SW1 is opened for sixty milliseconds, while the switch SW2 is closed for thirty milliseconds to disconnect the probe from the oscillator circuit 224 and instead connect a reference capacitor C4.

In order to test shorting of the probe, the P terminal 222 is connected via a resistor R6 to a comparator U13 which operates the third switch SW3. When the switch SW1 is open, if the probe operates normally then the switch SW3 is maintained closed. However, if the probe is shorted, then the comparator U13 causes the switch SW3 to open.

Figure 11:
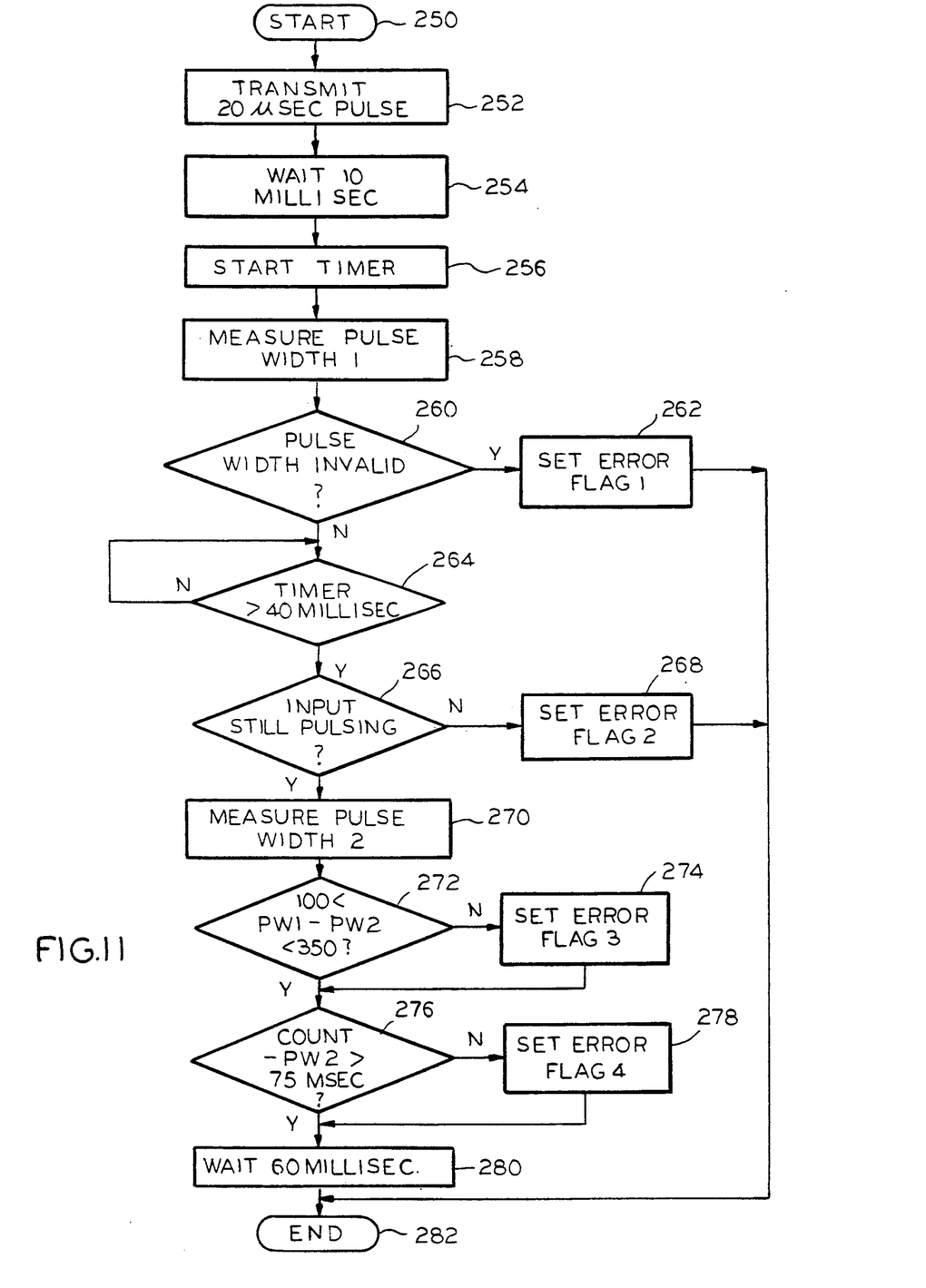
FIG. 11 is a software flow diagram illustrating operation of a self-diagnostics program implemented by the microprocessor of FIG. 8.

With reference to FIG. 11, a flow diagram for the self-diagnostics program implemented by the microprocessor U2 is illustrated. Control begins at a block 250 which starts the routine. At a block 252 a twenty microsecond pulse is transmitted via the latch circuit U13 to turn on the transistor Q5 to pull the power supply to ground. At a block 254 control waits approximately ten milliseconds to allow the one-shots U15A and U15B to open switch SW1 and close switch SW2, respectively, see FIG. 10. A timer is then started at a block 256. Thereafter, at a block 258 the pulse width is measured. This is the pulse width resulting from the reference capacitor C4 being connected to the oscillator circuit 224. At a decision block 260 a decision is made whether or not the pulse width expected from the reference capacitor is invalid. If so, then an error flag is set at a block 262 and control then ends. If the pulse width is not invalid, then control waits at a decision block 264 until the timer value exceeds forty milliseconds to allow sufficient time for the switch SW2 to open.

At a decision block 266 a determination is made whether or not a pulse signal is still being received from the oscillator circuit 224. Under normal operation, a pulse signal is always output from the oscillator circuit comparator U1 owing to the capacitor C6. However, if the probe is shorted, then the switch SW3 opens so that the square wave is not superimposed on the power supply signal. Therefore, if the input is not pulsing, indicating a shorted probe condition, then an error flag 2 is set at a block 268 and the routine ends. If the input is still pulsing, then control advances to a block 270 which measures the pulse width resulting from the capacitor C6. A decision block 272 verifies that the pulse width initially measured at the block 258 is greater than the pulse width measured at the block 270 by a value between 100 and 350 microseconds. This is done to compare the reference capacitance value to an open probe value to verify that the difference is in a selected range. If not, then an error flag 3 is set at a block 274. In either case, control advances to a decision block 276 which determines whether the count value determined by the pulse width measurement routine, see FIG. 5, minus the open probe pulse width measured at the block 270, is greater than 75 microseconds. Unless there is a minimum difference, representing capacitance of a bare rod in free space, the probe is assumed to be open and an error flag 4 is set at a block 278. Thereafter, control waits at a block 280 to allow sufficient time for the one-shots to return to normal operation and then control ends at the block 282.

Figure 12:
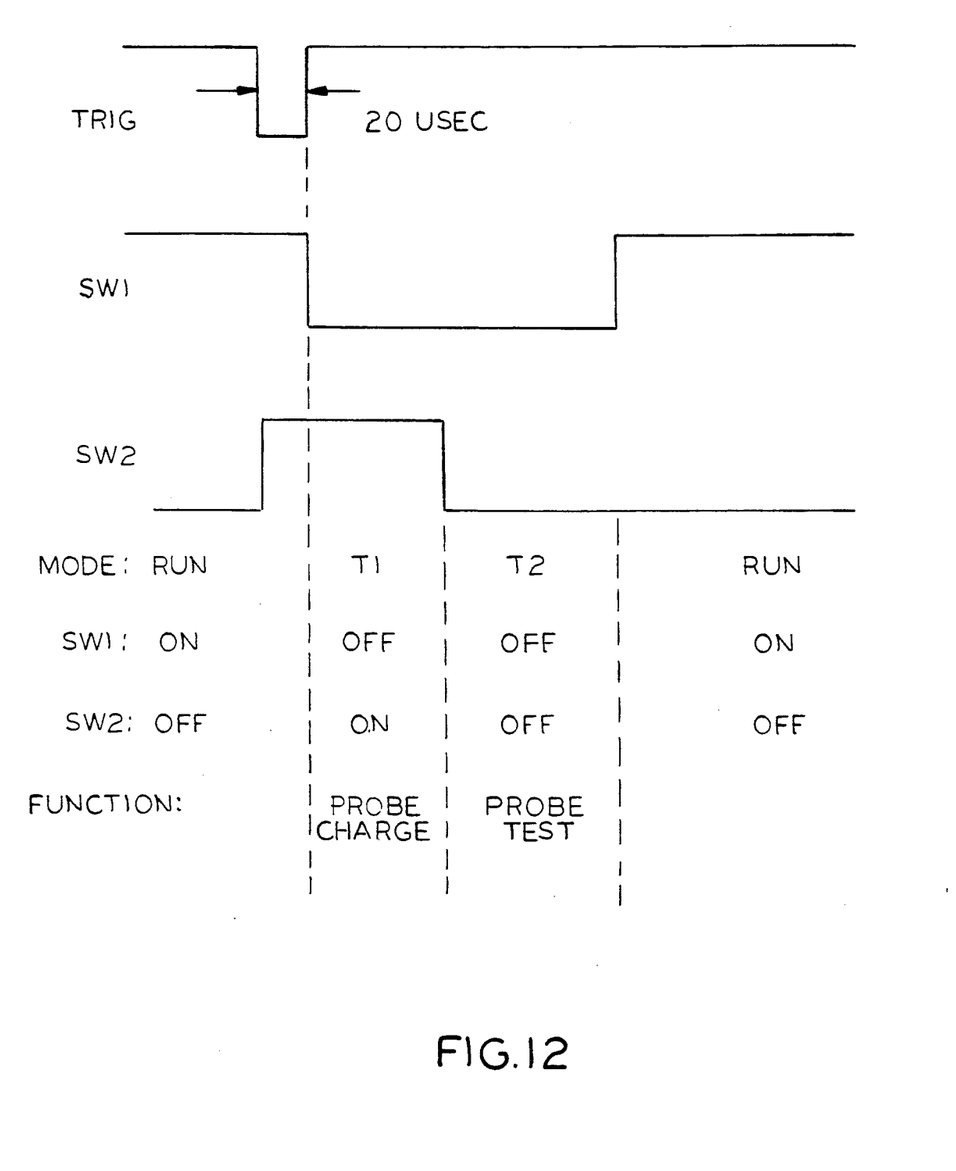
FIG. 12 is a timing chart illustrating operation of the self-diagnostics program of FIG. 11.

With reference to FIG. 12, a timing diagram illustrates operation of the self-test mode. Particularly, during the run mode the switch SW1 is on to connect the probe to the oscillator circuit and the switch SW2 is off to disconnect the reference capacitor C4. If the trigger pulse is sensed to initiate the self-test mode of operation, the switch SW2 is turned on instantaneously owing to the one-shot U15B being triggered at the leading edge of the pulse. At the trailing edge of the trigger pulse the switch SW1 is opened. Thus, the reference capacitor C4 is connected to the oscillator circuit 224 and the probe 20 is charged directly from the supply. Approximately, thirty milliseconds after the leading edge of the trigger pulse the switch SW2 is turned off to disconnect the reference capacitor and the probe test function is performed. Approximately, sixty milliseconds after the trailing edge of the trigger pulse the switch SW1 is again closed. Thereafter, control returns to the run mode upon completion of the self-diagnostic mode and any remaining time delay provided for the self-diagnostic mode.

Thus, in accordance with the invention, both a remote and integral version of the capacitance level instrument utilize the described self-test mode as well as averaging operations for determining level.

Although the instrument disclosed herein is a point level switch used for sensing discrete levels in the tank, the principals are equally applicable to a continuous level sensing instrument which provides continuous level measurement of material in a vessel.

The disclosed embodiments of the invention illustrate the broad inventive concepts comprehended hereby.

We claim:

1. An instrument for sensing level of a material comprising:
   a variable capacitor having an electrode adapted to be immersed in a material, the capacitance of the electrode being a function of material level;
   an oscillator circuit operable to develop an output signal having a period which is dependent upon an input capacitance;
   a switching circuit connected to said variable capacitor and to said oscillator circuit for selectively connecting said electrode to said oscillator circuit to measure said variable capacitance;
   a determining circuit connected to said oscillator circuit to determine the period of said output signal and including self test means controlling operation of said switching circuit to disconnect said electrode from said oscillator circuit for testing existence of an abnormal electrode condition.

2. The instrument of claim 1 wherein said self test means includes a charge circuit for charging said variable capacitor when said electrode is disconnected from said oscillator circuit and a comparator sensing level of charging of said variable capacitor to determine existence of a shorted electrode.

3. The instrument of claim 1 wherein said self test means includes means for comparing period of said output signal with said electrode connected and disconnected to determine existence of an open electrode condition.

4. The instrument of claim 1 wherein further comprising a reference capacitor connected to said switching circuit and said self test means controls operation of said switching circuit to connect said reference capacitor to said oscillator circuit for testing response of said oscillator circuit.

5. The instrument of claim 1 wherein said self test means includes a charge circuit for charging said variable capacitor when said electrode is disconnected from said oscillator circuit, a comparator sensing level of charging of said variable capacitor to determine existence of a shorted electrode and a switch means driven by said comparator for selectively disconnecting said oscillator circuit from said determining circuit responsive to existence of a shorted electrode.

6. The instrument of claim 1 wherein said oscillator circuit, said switching circuit and said determining circuit are contained in an integral housing.

7. The instrument of claim wherein said oscillator circuit and said switching circuit are contained in a first housing and said determining circuit is contained in a second housing.

8. The instrument of claim 1 wherein said determining circuit comprises a programmed microprocessor.

9. The instrument of claim 1 further comprising a relay circuit driven by said determining circuit for developing discrete outputs responsive to material level in the vessel being above or below select values.

10. The instrument of claim 1 further comprising a calibration circuit connected to said determining circuit and including a display displaying information related to period of said output signal and switches actuable by an operator to enter calibration information related to span and zero values of said period.

11. The instrument of claim 1 further comprising a counter connected between said oscillator circuit and said determining circuit for converting said output signal to lower frequency signal.

12. An instrument for sensing level of a material in a vessel comprising:
 a variable capacitor having a probe adapted to be immersed in a material, the capacitance of the probe being a function of material level in the vessel;
 an oscillator circuit connected to said probe operable to develop an output pulse signal having a period which is dependent upon the capacitance of the probe;
 a determining circuit connected to said oscillator circuit to determine the period of said output signal and including a counter means for counting an amount of time required to receive a plurality of pulses and dividing said time amount by a factor related to the number of said pulses to determine an average pulse period.

13. The instrument of claim 12 wherein said determining circuit includes averaging means for storing an accumulation value of periods for a select number of average pulse periods and said storing means is periodically updated with a most recent average pulse period to obtain a running average of the pulse period.

14. The instrument of claim 13 wherein said averaging means includes means for comparing a difference between the most recent average and the running average to a select level and replacing the running average with the most recent average if the difference is greater than the select level.

15. The instrument of claim 12 wherein said oscillator circuit and said determining circuit are contained in an integral housing.

16. The instrument of claim 12 wherein said oscillator circuit is contained in a first housing and said determining circuit is contained in a second housing.

17. The instrument of claim 12 wherein said determining circuit comprises a programmed microprocessor.

18. The instrument of claim 12 further comprising a relay circuit driven by said determining circuit for developing discrete outputs responsive to material level in the vessel being above or below select values.

19. The instrument of claim 12 further comprising a calibration circuit connected to said determining circuit and including a display displaying information related to average period of said output signal and switches actuable by an operator to enter calibration information related to span and zero values of said average period.

20. The instrument of claim 12 further comprising a counter connected between said oscillator circuit and said determining circuit for converting said output signal to lower frequency signal.

* * * * *